United States Patent
Remfry

(10) Patent No.: US 10,436,365 B2
(45) Date of Patent: Oct. 8, 2019

(54) REFUELING COUPLING

(71) Applicant: Leigh Maxwell Remfry, Waterlooville (GB)

(72) Inventor: Leigh Maxwell Remfry, Waterlooville (GB)

( * ) Notice: Subject to any disclaimer, the term of this patent is extended or adjusted under 35 U.S.C. 154(b) by 1593 days.

(21) Appl. No.: 13/871,031

(22) Filed: Apr. 26, 2013

(65) Prior Publication Data

US 2013/0313818 A1    Nov. 28, 2013

Related U.S. Application Data

(60) Provisional application No. 61/639,583, filed on Apr. 27, 2012.

(51) Int. Cl.
*F16L 37/08* (2006.01)
*B64D 37/00* (2006.01)

(52) U.S. Cl.
CPC .............. *F16L 37/08* (2013.01); *B64D 37/00* (2013.01)

(58) Field of Classification Search
CPC ................................. F16L 37/08; B64D 37/00
USPC .............. 285/33, 320; 141/59, 303, 348–350
See application file for complete search history.

(56) References Cited

U.S. PATENT DOCUMENTS

| | | | | |
|---|---|---|---|---|
| 2,637,572 A * | 5/1953 | Bruce | ................ | F16L 37/0848 137/614.02 |
| 3,866,638 A * | 2/1975 | Mingus | ................ | B60K 15/04 137/614.03 |
| 3,897,091 A * | 7/1975 | McMath | ................ | F16L 37/20 137/614.06 |
| 3,938,564 A * | 2/1976 | Jones | ................ | B60K 15/04 137/614.03 |
| 4,567,924 A * | 2/1986 | Brown | ................ | B64D 37/16 137/797 |
| 4,630,749 A * | 12/1986 | Armstrong | ................ | B67D 7/54 141/59 |
| 4,747,508 A * | 5/1988 | Sherwood | ................ | B60K 15/03519 141/326 |
| 4,765,504 A * | 8/1988 | Sherwood | ................ | B60K 15/03519 141/59 |
| 4,917,157 A * | 4/1990 | Gifford | ................ | B60K 15/04 123/519 |
| 5,022,433 A * | 6/1991 | Jansky | ................ | B60K 15/04 137/588 |
| 5,056,570 A * | 10/1991 | Harris | ................ | B60K 15/03519 141/302 |
| 5,078,170 A * | 1/1992 | Henry | ................ | F16L 29/007 137/614.06 |

(Continued)

*Primary Examiner* — Anna M Momper
*Assistant Examiner* — Fannie C Kee
(74) *Attorney, Agent, or Firm* — Bay State IP, LLC

(57) ABSTRACT

A refueling coupling has an annular fitting having a bore, bayonet lugs and slots suiting it for connection to a pressure filling nozzle. A dry-break member is provided within the annular fitting, normally sealing to it with the aid of an O-ring seal. When the pressure filling nozzle is fitted, the dry-break member is depressed allowing fuel to flow. The dry-break member has a central aperture, normally closed by a side pivoted flap. The pivot is at a pin carried in lugs on the underside of a central disc having the aperture. The flap has a finger projecting between the lugs and having the pin passing through it. A spring is carried on the pin and normally biases the flap into its closed position parallel with the disc.

14 Claims, 18 Drawing Sheets

(56) References Cited

U.S. PATENT DOCUMENTS

| | | | | |
|---|---|---|---|---|
| 5,431,199 A | * | 7/1995 | Benjay | B60K 15/03519 |
| | | | | 137/588 |
| 6,691,750 B1 | * | 2/2004 | Foltz | B60K 15/04 |
| | | | | 141/348 |
| 2011/0162754 A1 | * | 7/2011 | Murabayashi | B60K 15/04 |
| | | | | 141/286 |

* cited by examiner

REFUELING COUPLING

CROSS REFERENCE TO RELATED APPLICATION

This application claims priority to and takes the benefit of U.S. Provisional Application Ser. No. 61/639,583 filed on Apr. 27, 2012, the contents of which are hereby incorporated by reference.

BACKGROUND OF THE INVENTION

Field of the Invention
The present invention relates to a refueling coupling.
Description of the Related Art
Road vehicles are usually refueled with a so-called "gravity" refueling nozzle to which fuel is pumped under pressure, but from which the fuel flows under gravity into a vehicle's filler neck or refueling coupling.

Many air-borne and some other vehicles are refueled with a pressure refueling nozzle, which is fluid-tightly connected to the vehicle's refueling coupling.

Some vehicles do indeed include both types of refueling coupling. This is expensive, bulky and introduces a weight penalty on an aircraft.

As used herein, the term coupling is used to mean the vehicle side connector; whereas the term nozzle is used to mean the refueling vessel and refueling side connector. We are aware that this terminology is not universal and that in other regions the term coupler is used to mean the hose side connector.

Also as used herein, the term dry-break is used to mean that the coupling and nozzle are adapted to be both sealed when not connected to each other.

SUMMARY OF THE INVENTION

The object of the present invention is to provide a combined pressure and gravity refueling coupling.

According to a first aspect of the invention there is provided a refueling coupling having:
   an annular member,
   a fitting on the annular member complementary to a pressure refueling nozzle and
   a displaceable dry-break member in the coupling for normally sealing the coupling via a seal between the annular member and the dry-break member, the dry-break member being displaceable from its sealing position on connection of a pressure refueling nozzle, the dry-break member including:
      an aperture in the displaceable dry-break member and
      a subsidiary displaceable member carried by the dry-break member, this member normally closing the aperture and being displaceable by introduction of a gravity refueling nozzle into the aperture.

Normally the main displaceable dry-break member will be translationally displaceable against a return spring. Such an arrangement is possible for the subsidiary displaceable member. However in the interests of allowing the "gravity" nozzle to penetrate past the subsidiary displaceable member, the latter is preferably pivotally connected to the main dry-break member. Conveniently, the pivot is provided with a spring for returning the subsidiary member to its normally closed position. Preferably the main and subsidiary members are adapted for sealing of the subsidiary member to the main member, whereby full dry-break operation is available when pressure refueling.

Insofar as the coupling may be provided separate from a fuel tank, that is in a vehicle skin, and/or the tank may be flexible, the main dry-break member is preferably mounted on rods extending from the fitting and having springs for returning the dry-break member back to the fitting and a hose is provided around the rods for connection to both the fitting and the tank. The inner ends of the rods can be carried on the annular member or at least a sleeve being an integral extension of the annular member or on an abutment member in the form of a spider or a ring.

Preferably the coupling is provided with an air vent having a float arranged to close as the tank fills for causing back-pressure in the connector when the tank is full. Additionally an airflow restrictor is preferably provided in an air vent duct. The restrictor is preferably adapted to open to a limited extent to accommodate gravity refueling air escape and to a greater extent to allow an increased air flow in the case of pressure refueling, with its great fuel flow.

According to a second aspect of the invention, there is provided an adapter for a refueling coupling, the adapter being generally tubular and having:
   a fitting at one end complementary to a pressure refueling nozzle,
   a fitting at the other end complementary to that on annular member and
   a shuttle extending between the ends of the adapter, the shuttle being adapted and arranged to be displaced by a displacement member of the pressure refueling nozzle and to displace the displaceable dry-break member.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENTS

Figure 1:
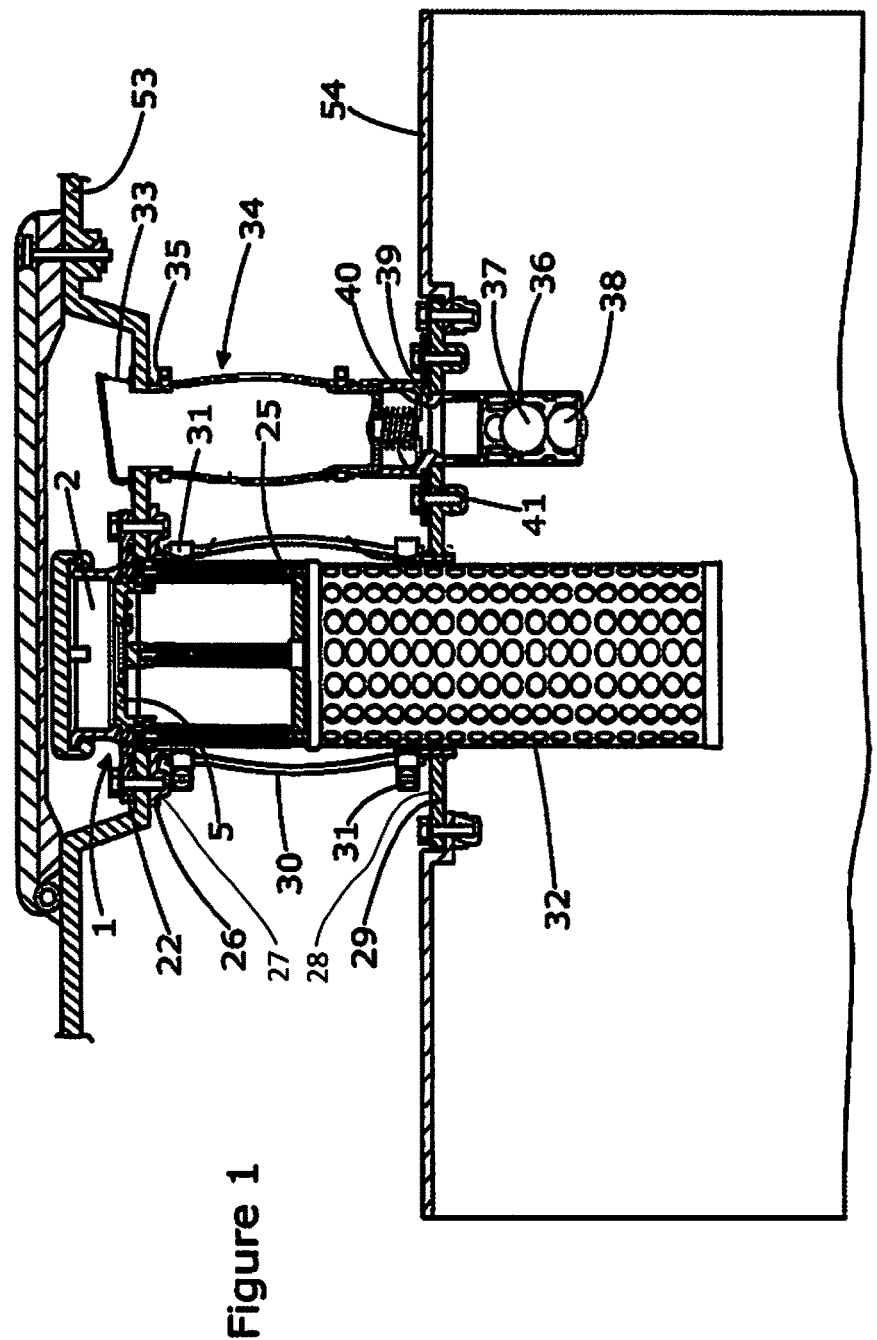
FIG. 1 is a cross-sectional side view of a refueling coupling of the invention installed in the skin of a vehicle (not shown) and connected to a fuel tank.
Figure 2:
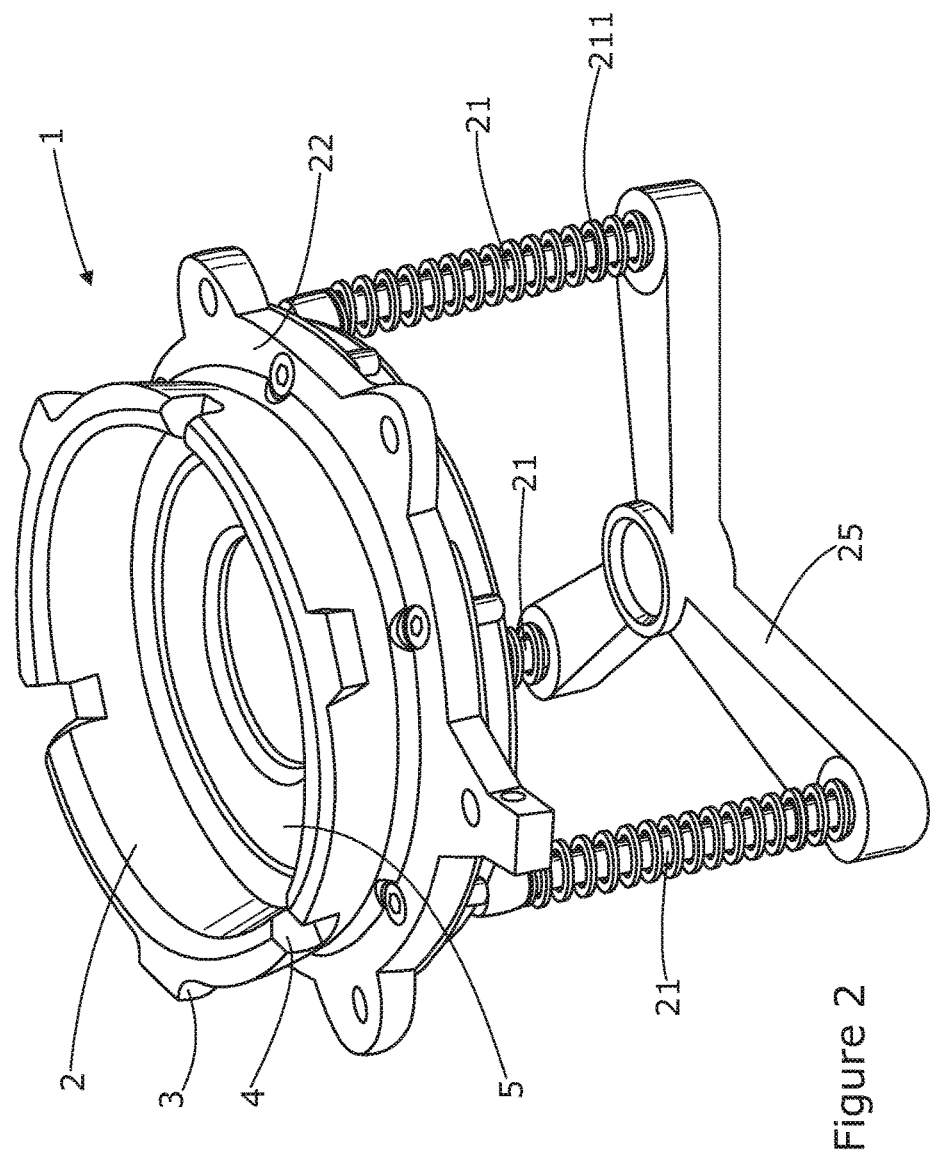
FIG. 2 is a perspective view of the coupling as such.
Figure 3:
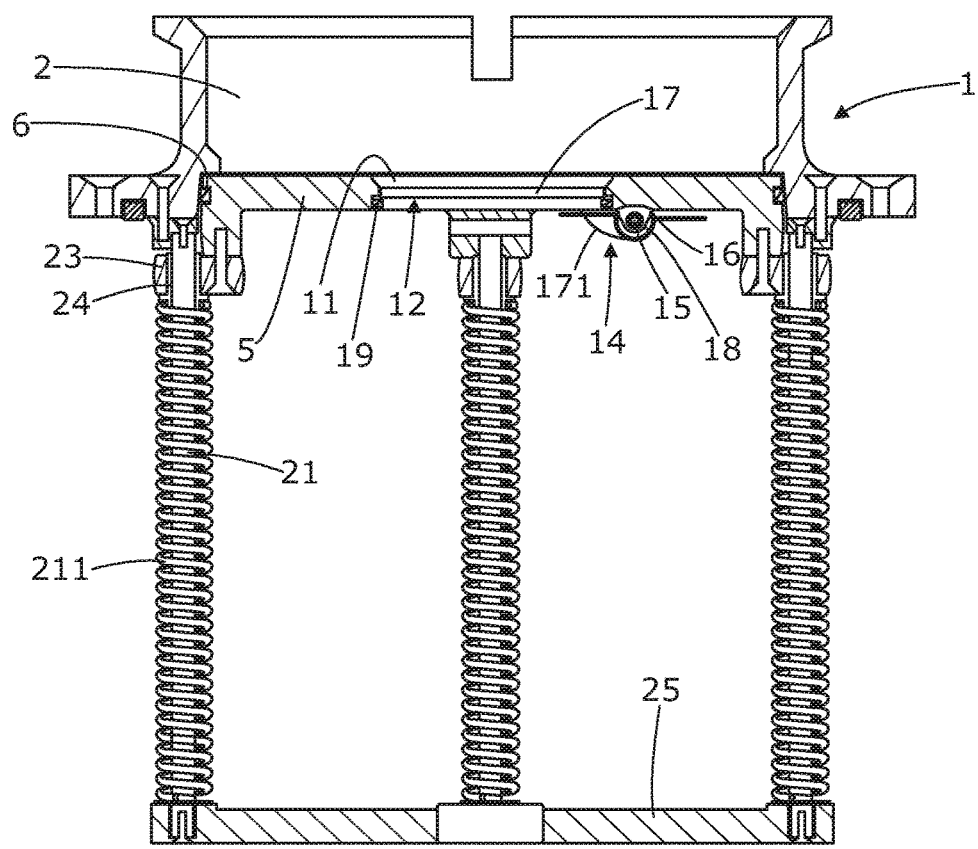
FIG. 3 is a side view of the coupling of FIG. 2.

Referring to the drawings, the refueling coupling there shown has an annular fitting 1 having a bore 2, bayonet lugs 3 and slots 4 suiting it for connection to a pressure filling nozzle 50. A dry-break member 5 is provided within the annular fitting, normally sealing to it with the aid of an O-ring seal 6. When the pressure filling nozzle is fitted, the dry-break member is depressed allowing fuel to flow. In this respect, the refueling coupling is conventional.

In accordance with the invention, the dry-break member has a central aperture 11, normally closed by a side pivoted flap 12. The pivot 14 is at a pin 15 carried in lugs 16 on the underside of a central disc 17 having the aperture 11. The flap has a finger 171 projecting between the lugs and having the pin passing through it. A spring 18 is carried on the pin and normally biases the flap into its closed position parallel with the disc. An O-ring 19 is carried on the flap whereby should unusual forces displace fuel against the flap it does not leak.

Figure 4:
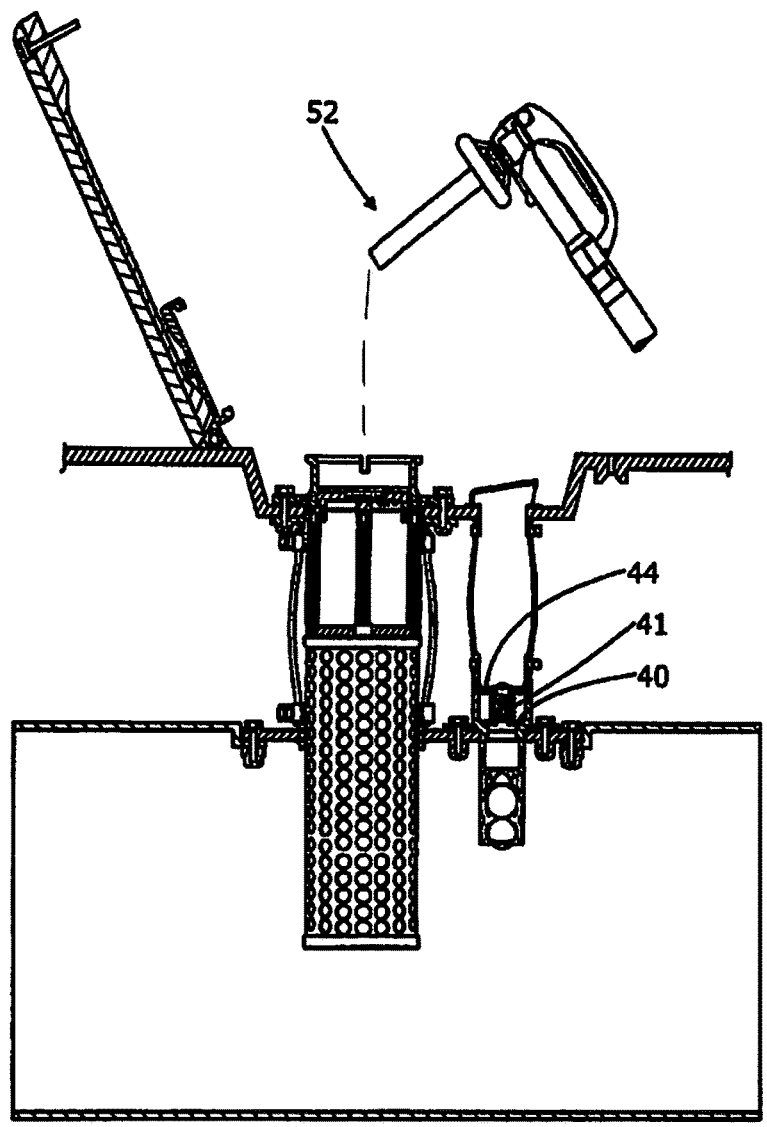
FIG. 4 is a view similar to FIG. 1 in preparation for refueling with a gravity nozzle.
Figure 5:
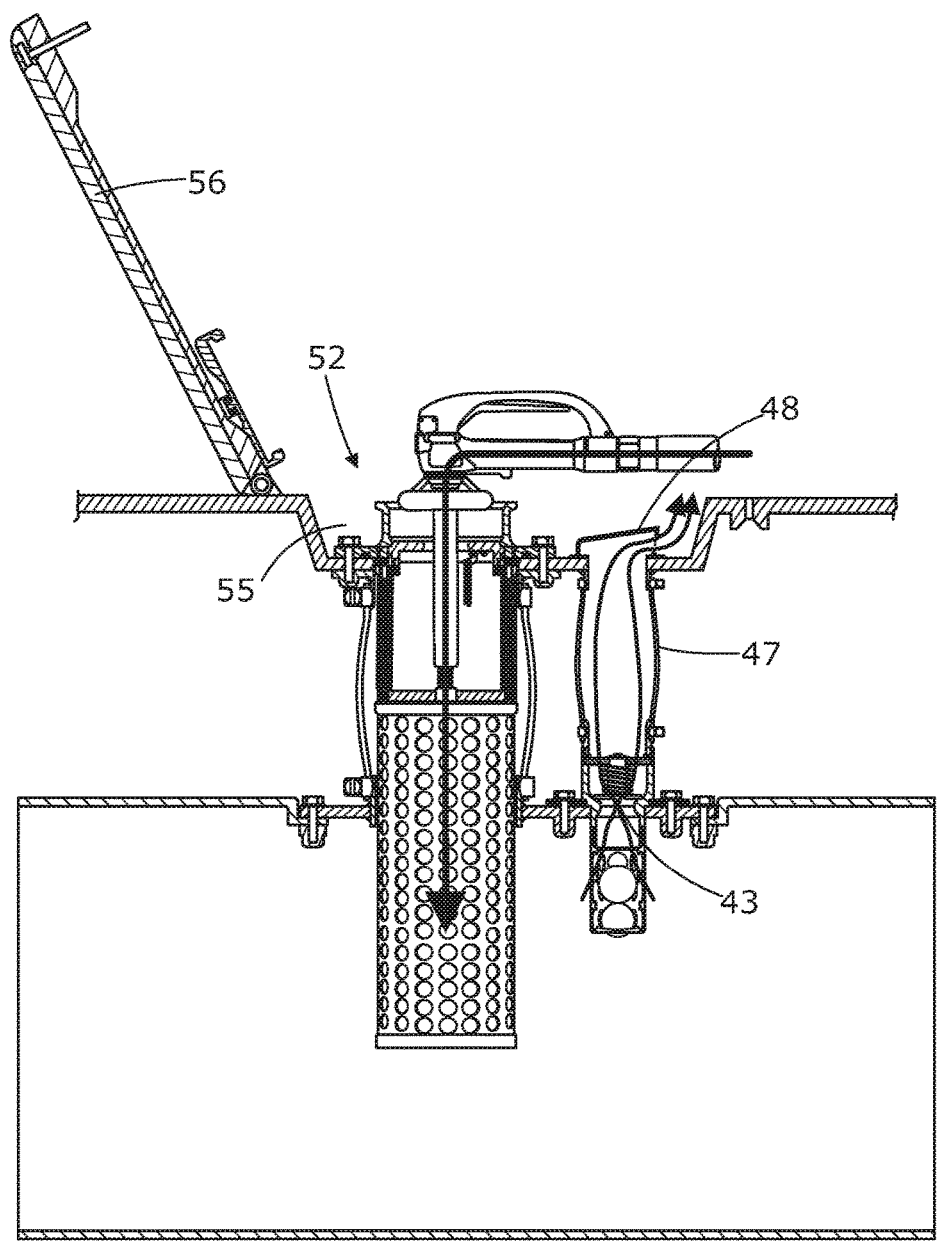
FIG. 5 is a similar view during gravity nozzle refueling.
Figure 6:
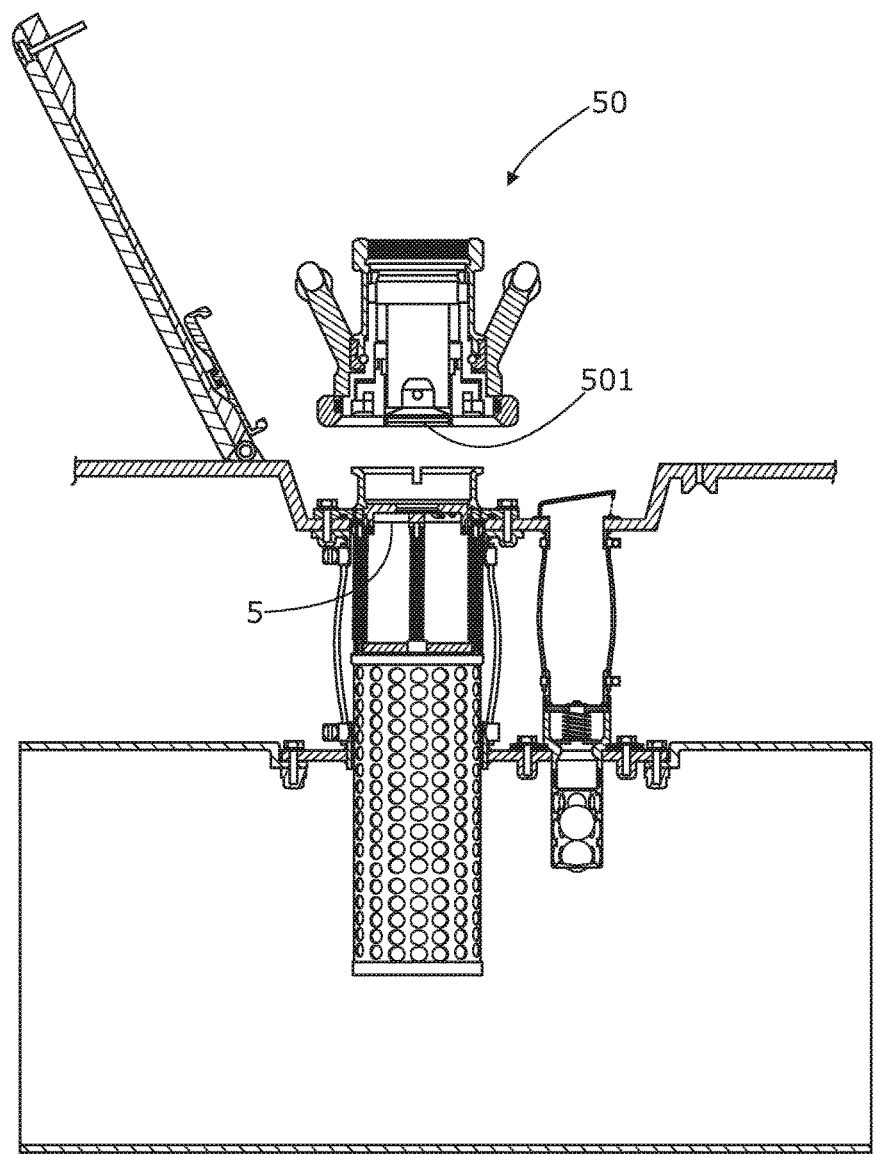
FIG. 6 is another such view in preparation for pressure nozzle refueling.
Figure 7:
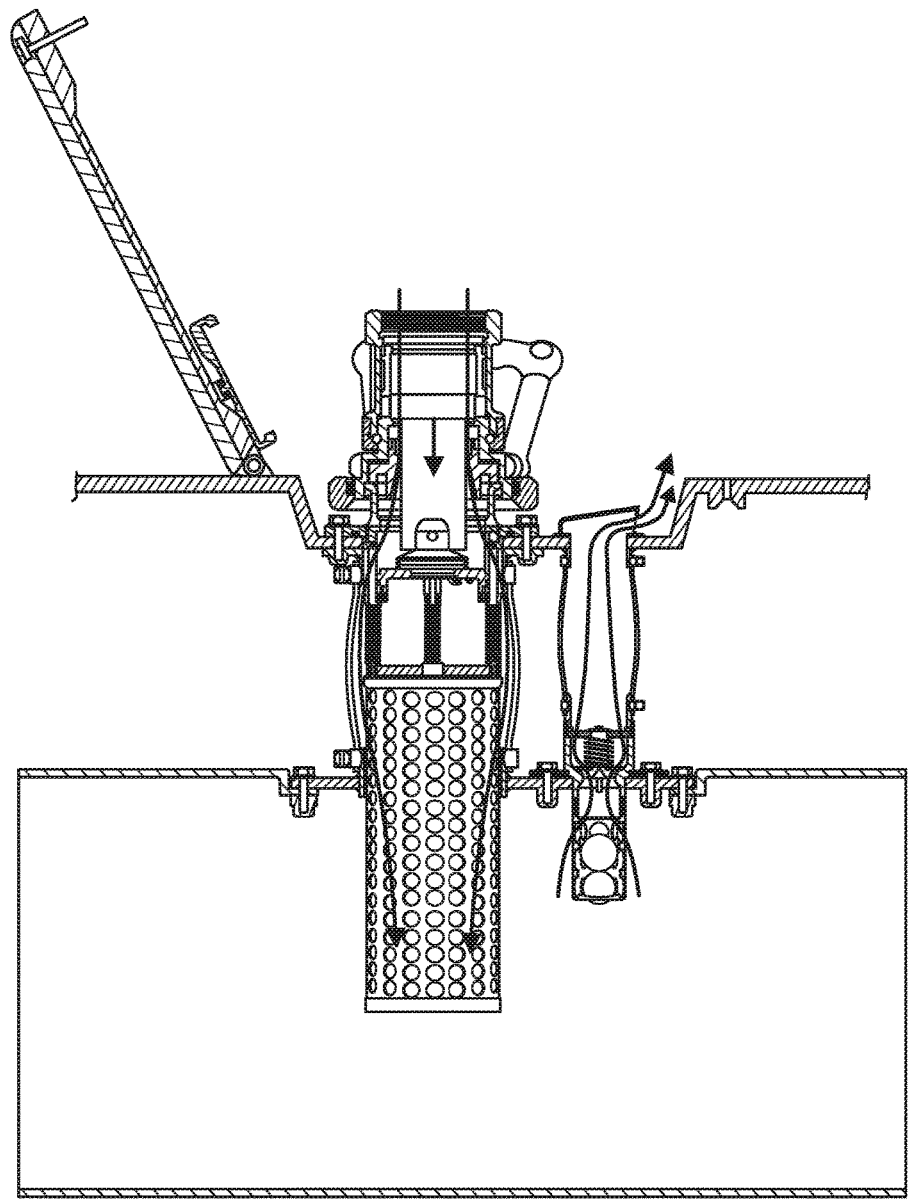
FIG. 7 is a similar view during pressure nozzle refueling.

For gravity nozzle fuelling, as shown in FIGS. 4 & 5, a gravity fuelling nozzle 52 is placed against the flap and pushed in against its spring. Refueling can now occur.

The fitting 1 has three rods 21 secured to the underside of a fixture rim 22. The dry-break member has three projections 23 with bores 24 through which the rods project. Lower ends of the rods are fastened in a spider 25. The rods carry springs 211 which normally bias the dry-break member into sealing contact with the fitting 1.

For pressure refueling, the pressure refueling nozzle 50 is latched on and operated to cause its dry-break member 501 to physically displace the member 5 for flow of fuel around it. Should de-fuelling be required through a pressure refuel nozzle, in the case of the vehicle having the refueling coupling, it should be noted that neither the flap 12 nor the disc 17 inhibit this because scavenged fuel can flow around the dry break member 5 which is displaced from its seat in the annular fitting 1.

In the embodiment of FIGS. 1 to 7, the fitting is fastened in the skin 53 of a vehicle, with the skin being sandwiched between the rim 22 and a ring 26. The ring has a rim 27. A similar rim 28 is provided on a closure plate 29 of a fuel tank 54. Extending between the rims 27 & 28 is a flexible hose 30, held to the rims by screwed bands 31. Thus fuel flow is directed into the tank which is allowed some deflection within the skin 53 or vice versa. A strainer 32 is shown extending from the spider 25 into the tank.

Figure 8:
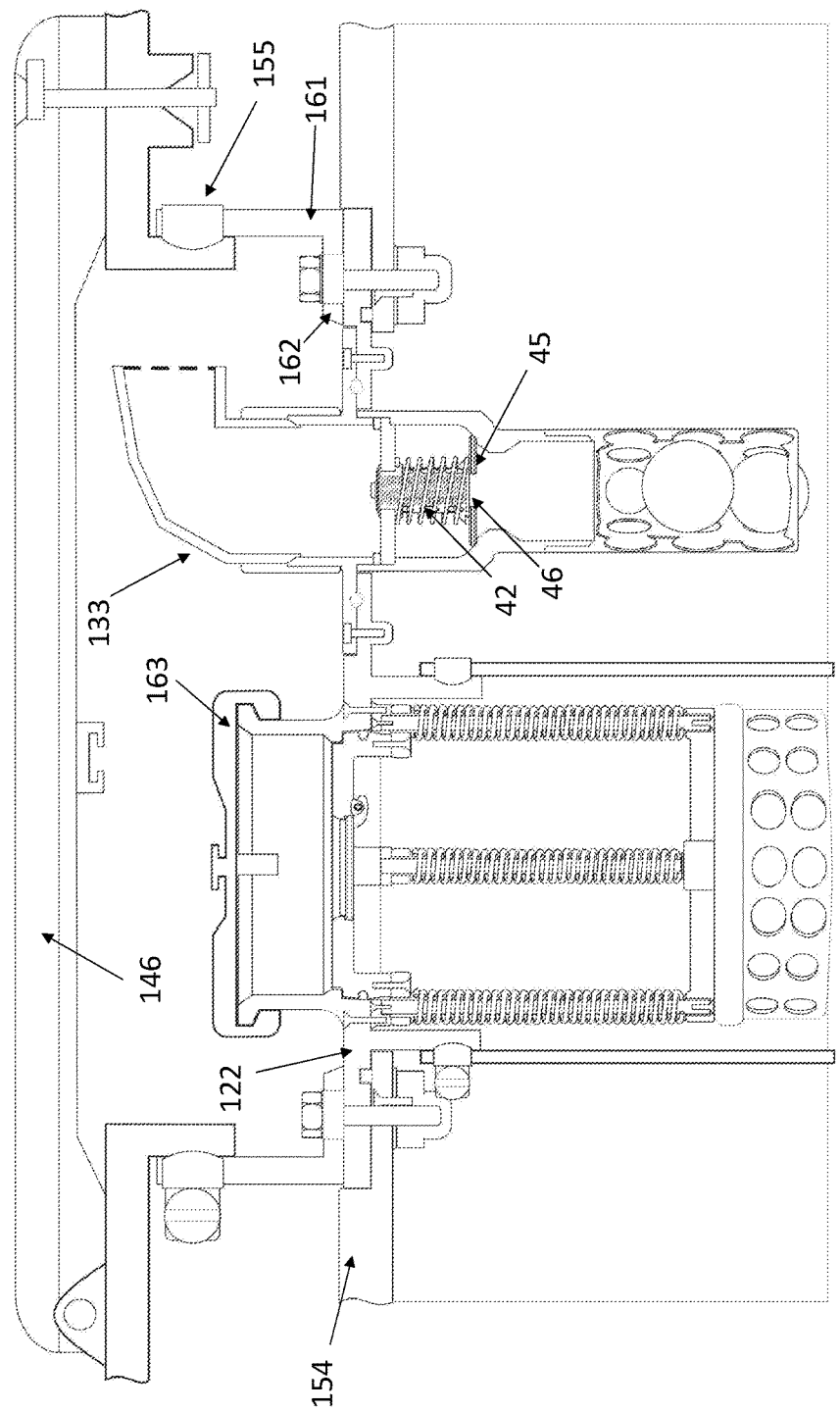
FIG. 8 is a view similar to FIG. 1 of a varied refueling coupling.
Figure 9:
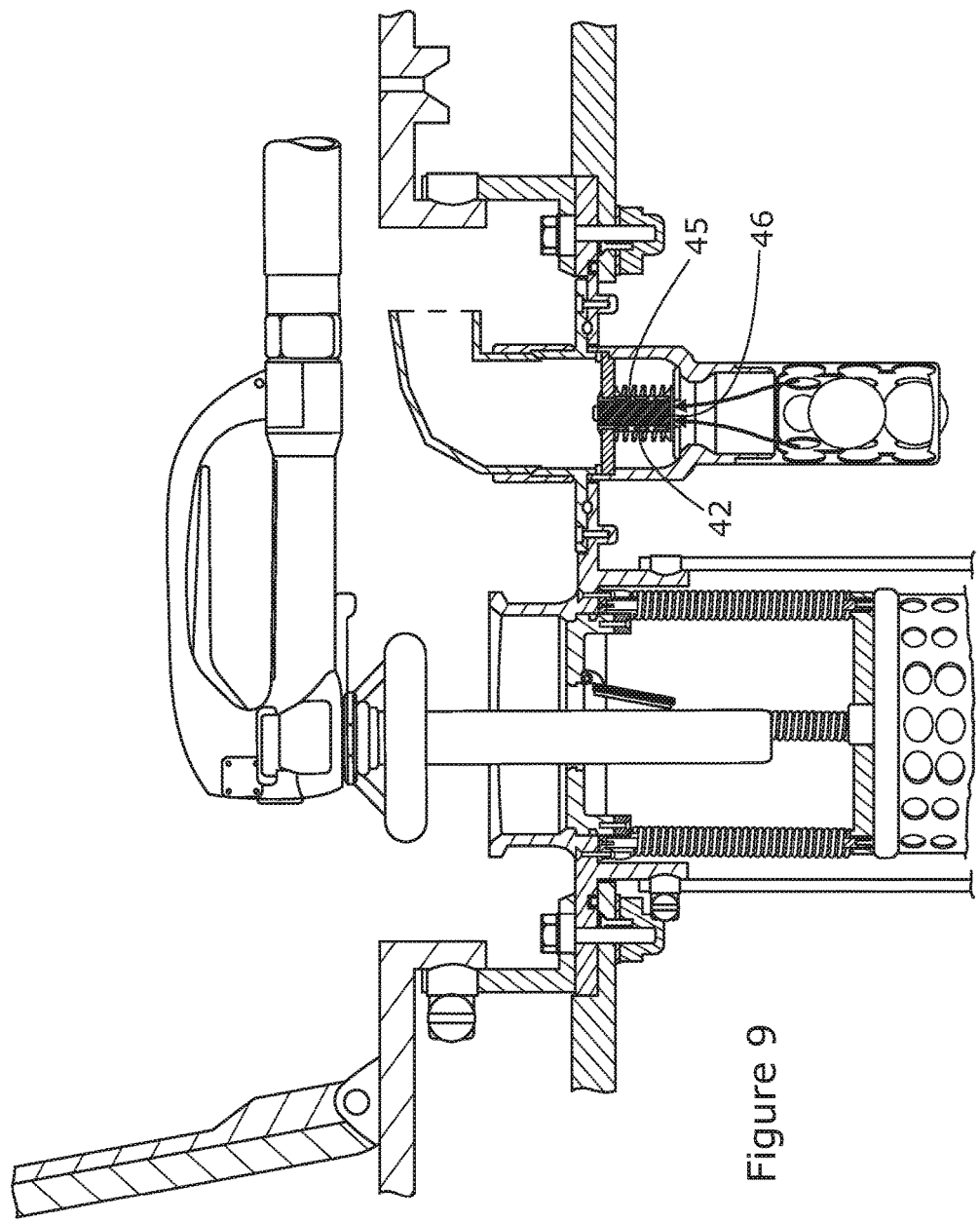
FIG. 9 is a similar view during gravity nozzle refueling.
Figure 10:
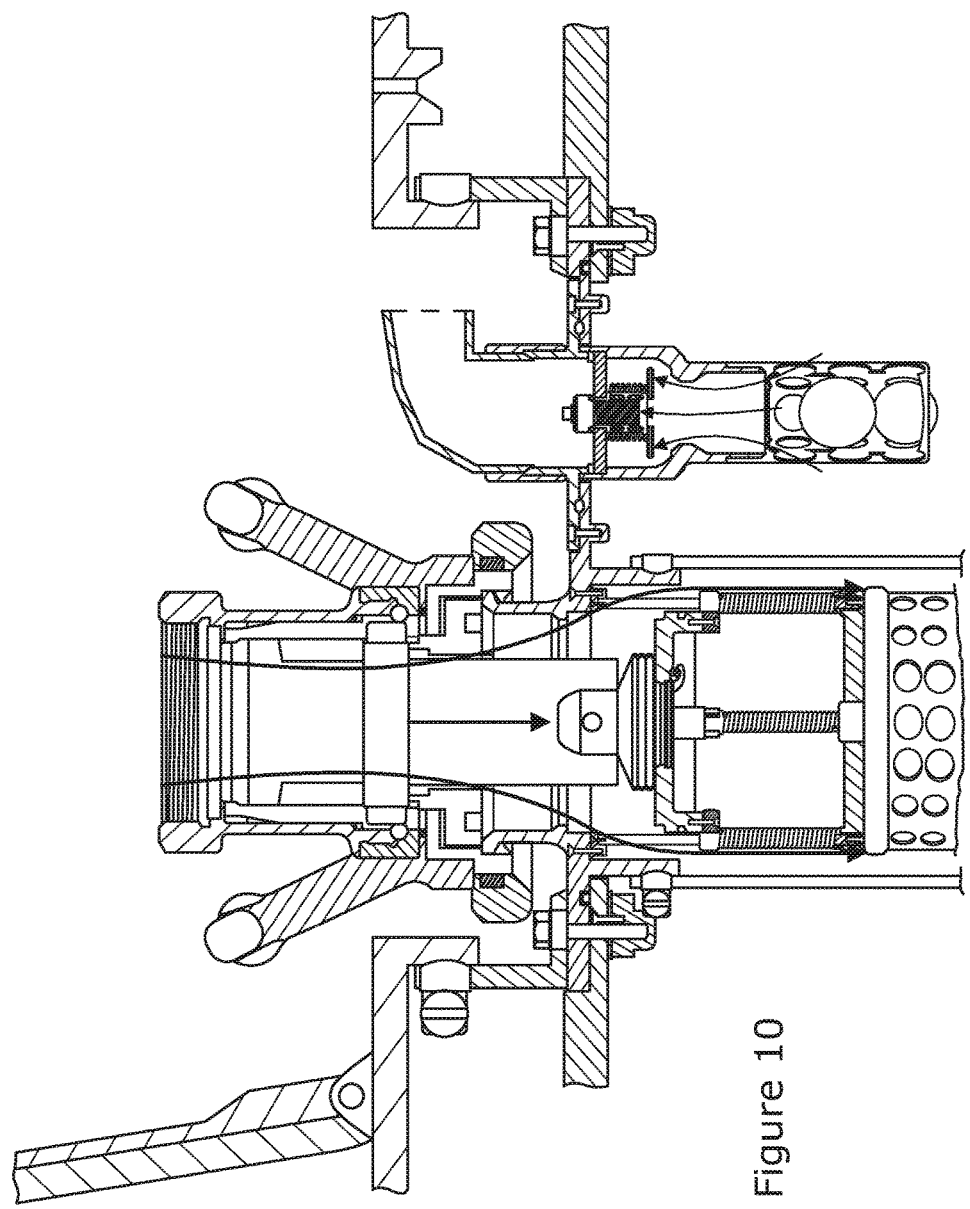
FIG. 10 is a similar view during pressure nozzle refueling.
Figure 11:
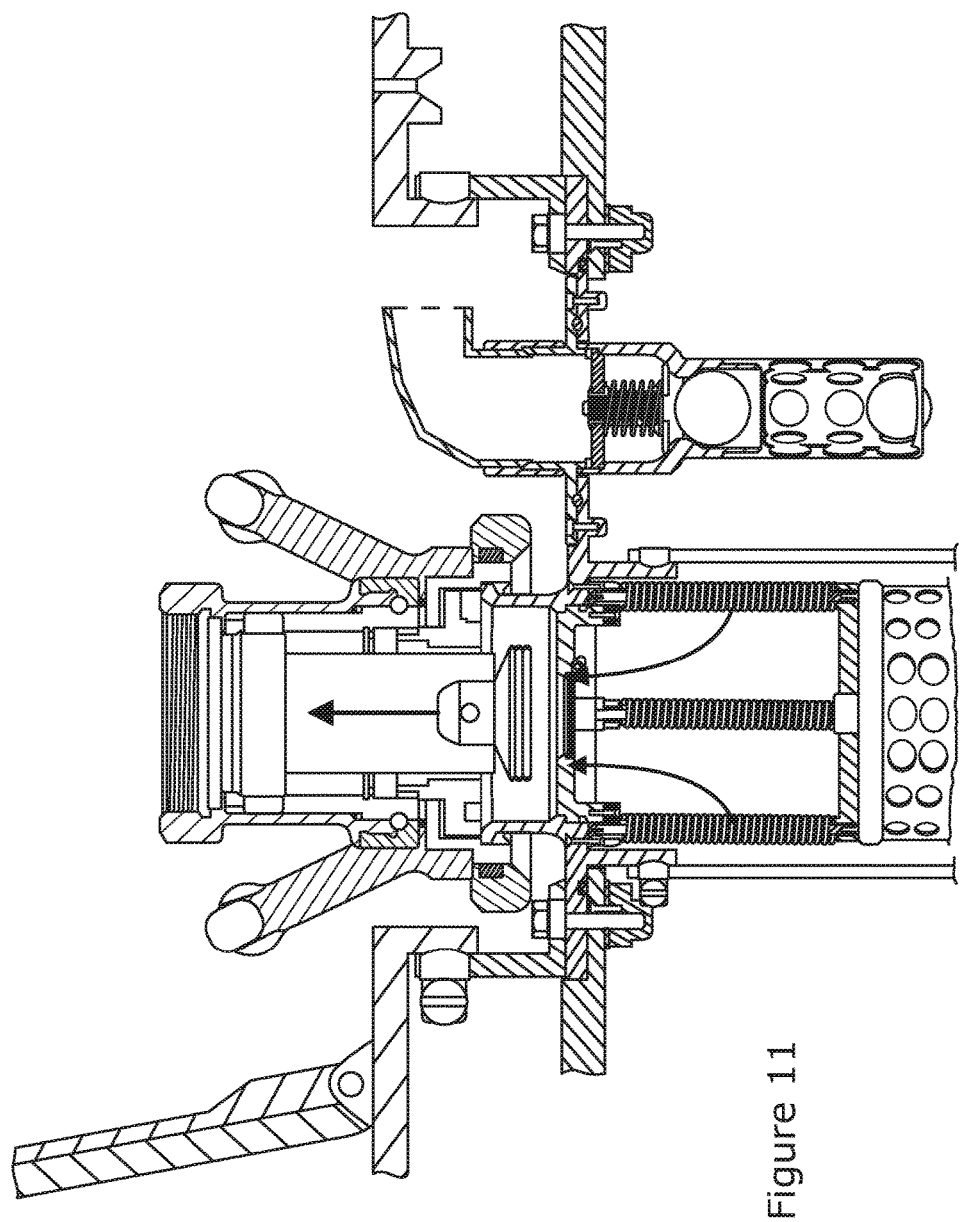
FIG. 11 is another view showing the finish of pressure nozzle refueling.
Figure 18:
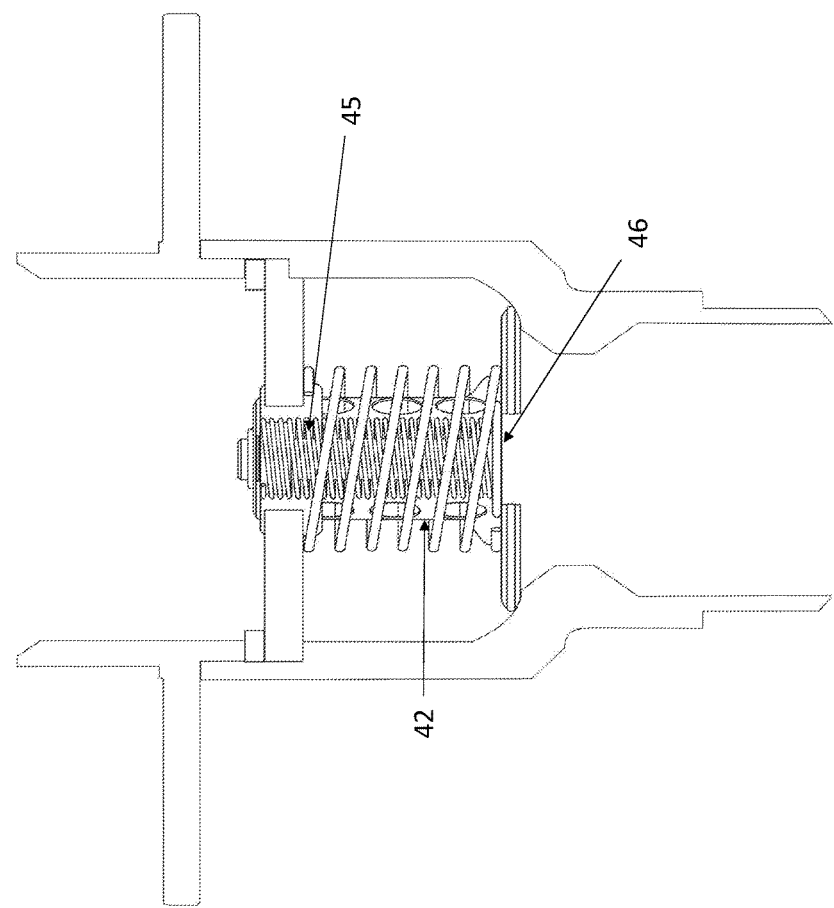
FIG. 18 is an enlarged view of the aperture sleeve shown in FIGS. 8 and 9.

Also mounted in the tank plate 29 is an air vent 33 in the form of a duct 34 secured via a rim 35. The duct 34 carries an apertured ball retainer cage 36 which retains a buoyant ball 37 and a dense ball 38. The latter is for forcing the buoyant ball to seal in a vehicle inversion. The buoyant ball seals during refueling by floating against a seat 39 above the cage. Above the seat, an airflow limiting disc 40 is urged against the seat by a spring 41. The disc is open centrally 43 and carried on an apertured sleeve 42 carrying the spring 41. The sleeve is secured by a cross pin 44, against which the spring reacts. Internally of the sleeve a second spring 45 urges an inner sealing disc 46 into the central opening 43 of the disc 40. Features 42, 45 & 46 are shown in FIG. 8 and FIG. 18.

During gravity nozzle filling air pressure lifts the inner disc 46 against the second spring 45 and flows through the disc and up through the apertures 42 in the sleeve. Thus a pressure marginally above ambient is maintained in the tank, for quick closure of the nozzle's trigger when the tank is filled to the extent that the buoyant ball 37 seals against the seat 39.

When pressure nozzle filling, the air flow is too great for the apertured sleeve and the air pressure in the tank lifts the disc 40. The latter with the action of its spring 41 keeps the pressure just above ambient, again causing the fuel flow to be shut off by detection of pressure rise when the buoyant float seals.

To vent tank air to atmosphere, a hose 47 extends up from the vent 33 via a deflector 48. This and the fitting 1 are housed in a depression 55 in the skin. A hinged closure 56 is provided for closing the depression, whereby the external lines of the vehicle are little disturbed by the single refueling fitting of the invention.

Alternatively to the above use of hoses, the fitting can be fastened to a tank via its rim 22.

The invention is not intended to be restricted to the details of the above described embodiment. For instance, as shown in FIGS. 8 to 11, the rim 22 of the fitting 1 can be more extensive as a plate 122 having the air vent 133 attached directly to it. Also in this arrangement, the skin 53 of the vehicle has an in-turned lip 155 to which a collar 161 is attached. The collar has a radially inward extending flange 162. This is secured to the plate 122 and to the fuel tank 154. A detail shown in these figures is a cap 163 for closing the fitting once the refueling nozzle is removed. This is in addition to the hinged closure 146, which closes over the cap when fitted to the fitting.

Figure 12:
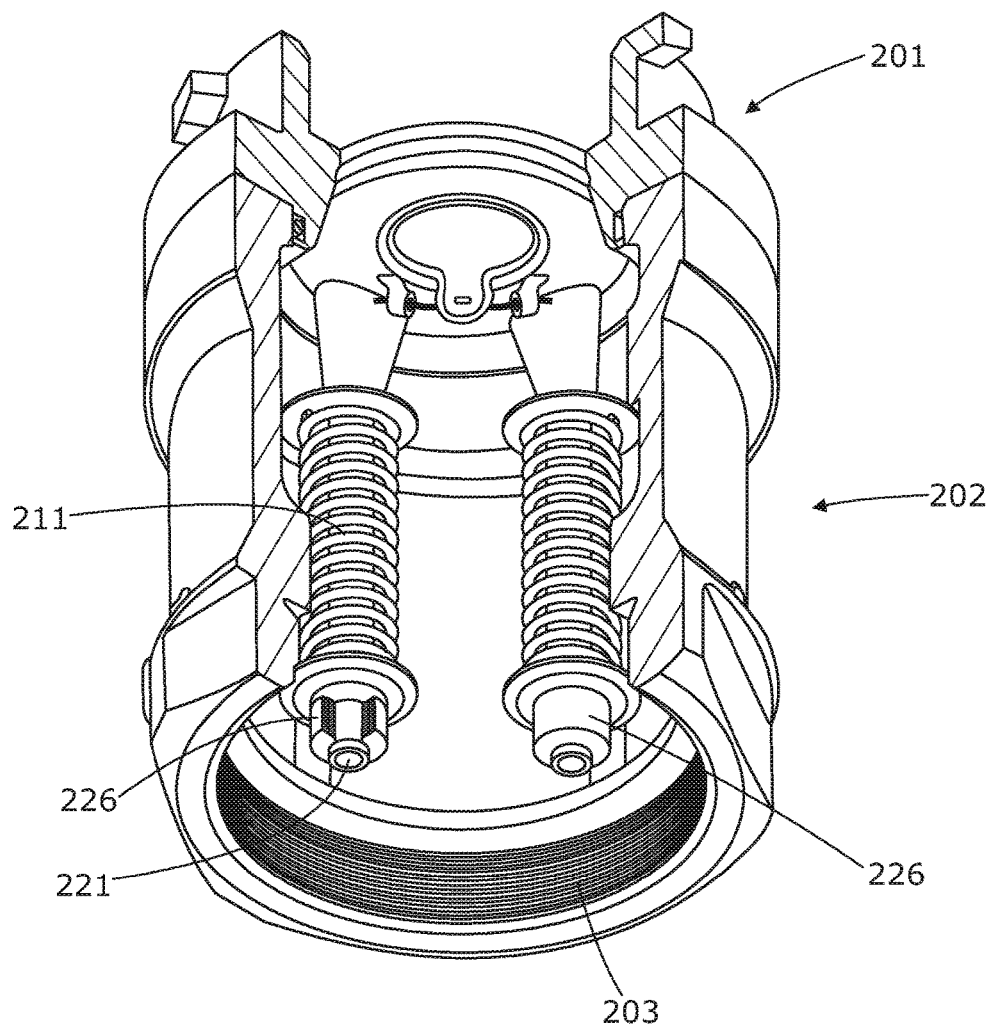
FIG. 12 is a partially sectioned, perspective view of another refueling coupling of the invention.
Figure 13:
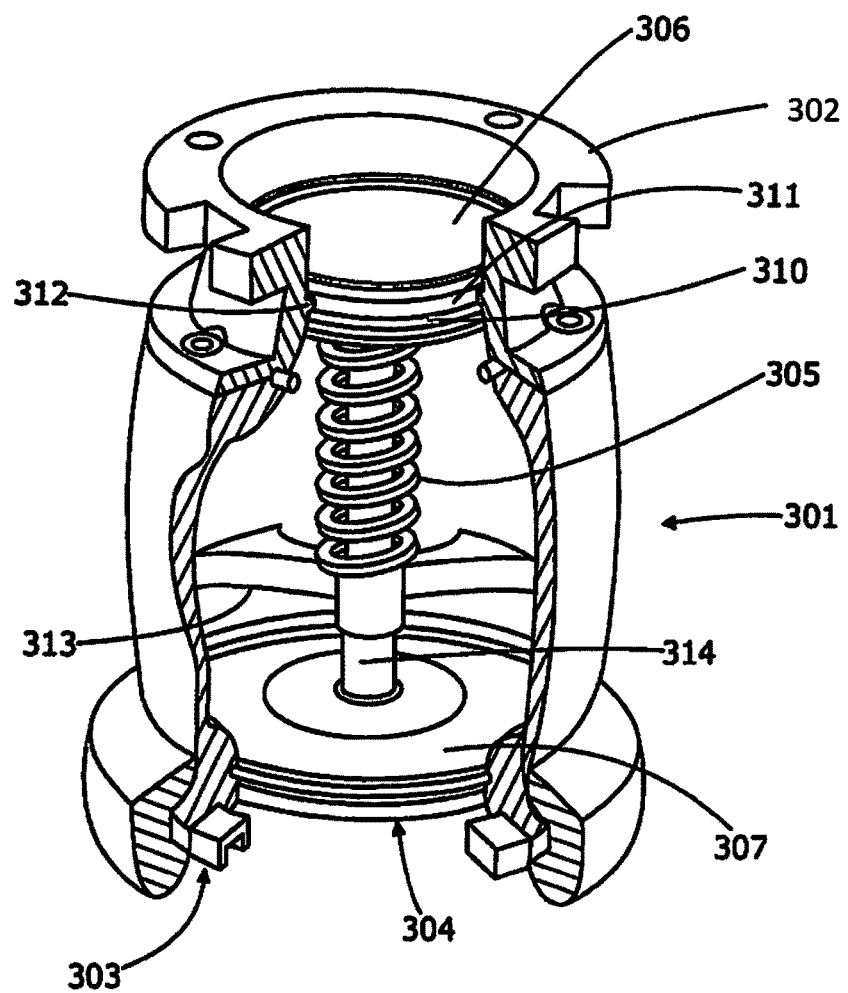
FIG. 13 is a partially sectioned view of an adapter for a refueling coupling of the invention and
   FIG. 14, FIG. 15 and FIG. 16 are cross-sectional side views in the attachment and refueling use of a pressure refueling nozzle to the refueling coupling of FIG. 12 via the adapter of FIG. 13
Figure 14:
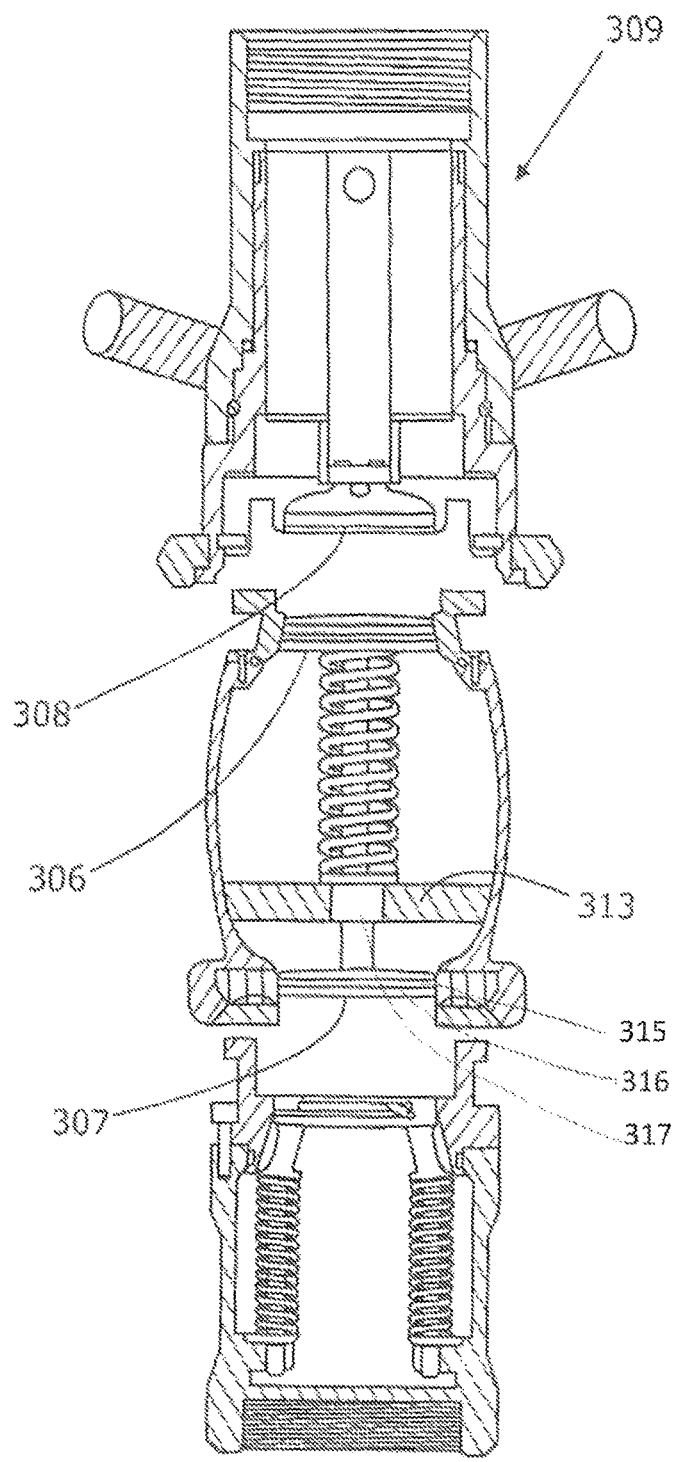
Figure 15:
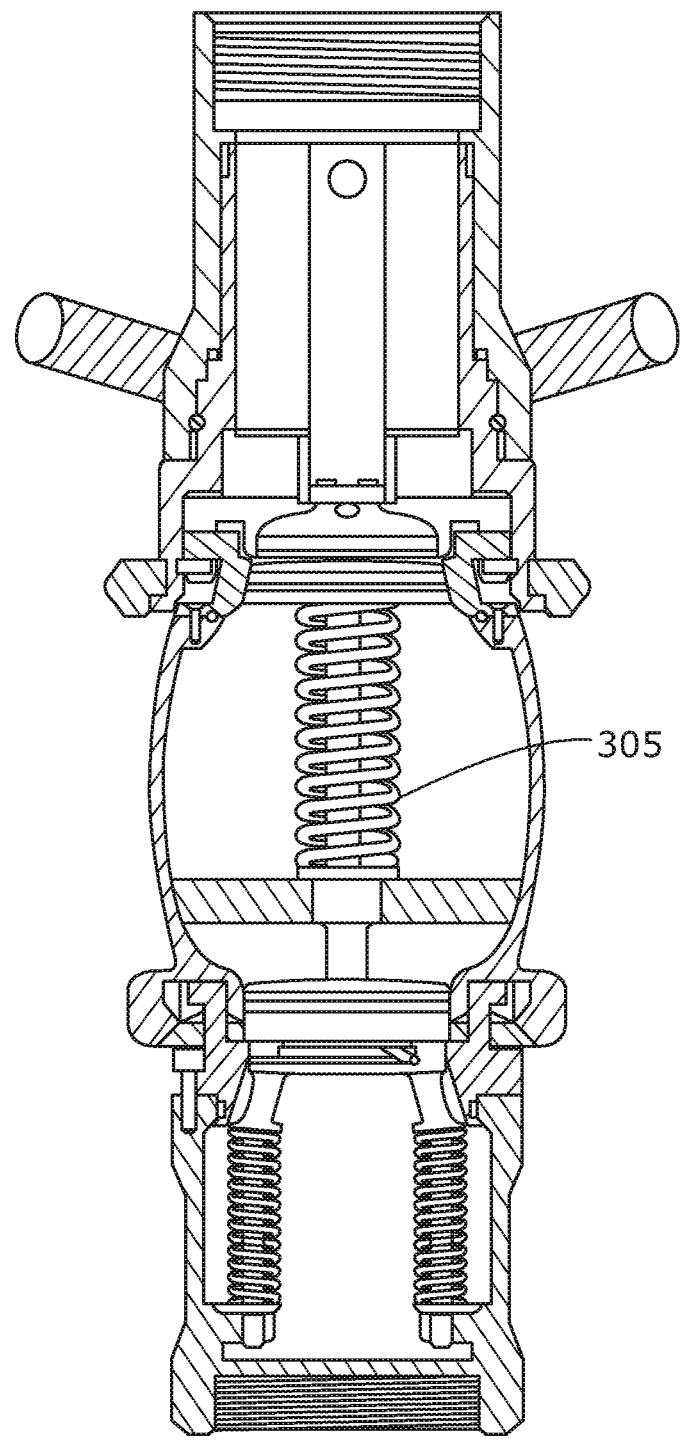
Figure 16:
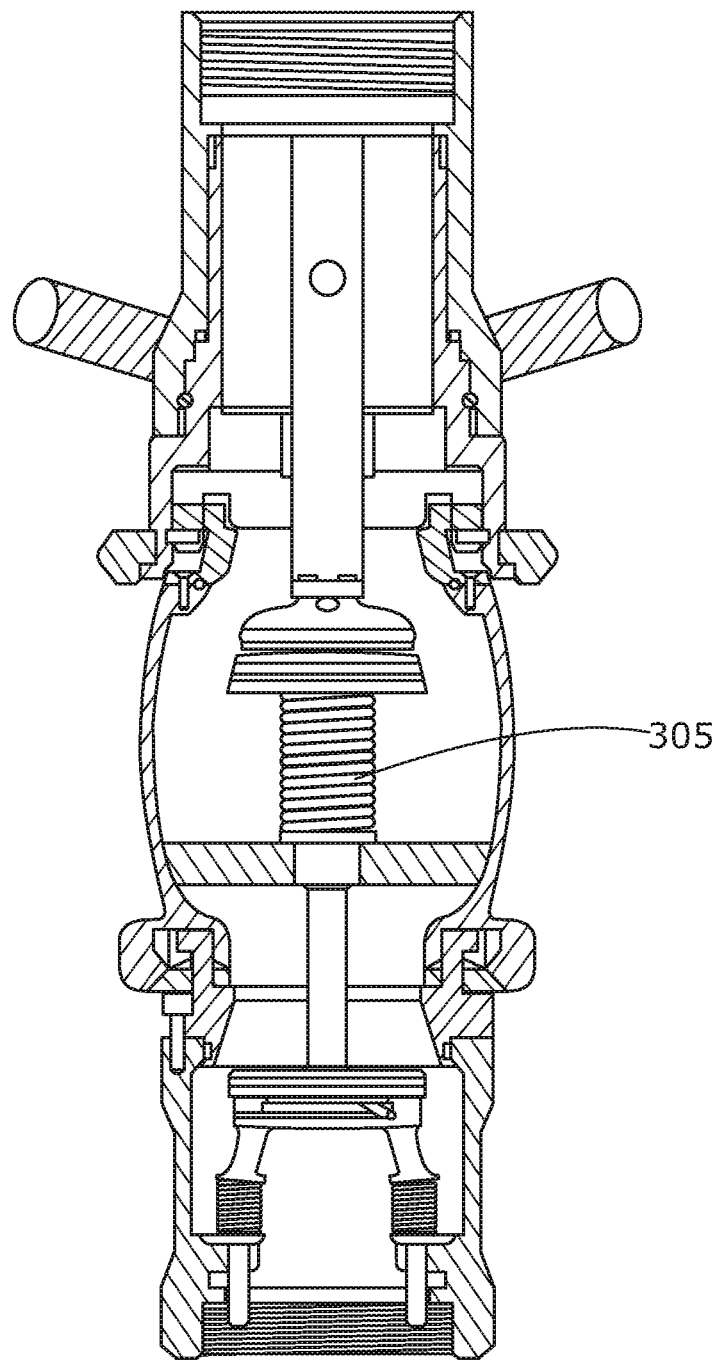

Further, as shown in FIG. 12, the ring or at least lugs 226 carrying the end of the rods, the hose and the lip can be an integral part of the fitting 201 adapted for connection to a pressure filling nozzle, or at least these features can be provided as two parts, namely the fitting 201 and a main sleeve 202 housing the rods 221 and springs 211. In this variant, the main sleeve is threaded 203 for connection to the fuel tank.

FIGS. 13 to 16 show an adapter for adapting the refueling coupling to a pressure refueling nozzle of a different size. Essentially the adapter 301 is generally tubular with a male fitting 302 at one end complementary to a pressure refueling nozzle 309 and a female fitting 303 at the other end, which is complementary to the coupling fitting. Within the adapter is a shuttle 304, biased by a spring 305 for a male end piston 306 to seal the male tubular end and a female end piston 307 to seal the female tubular end. The shuttle is displaced on refueling to release the seals and allow fuel to flow.

The male-end piston 306 is flat for dry-break co-operation with a displacement member 308 of the pressure refueling nozzle 309. It carries a peripheral sealing O-ring 310 on its periphery 311, which is tapered for abutting with a seat 312 in the adapter. This abutment determines the position of the piston 306 under the action of the spring 305. Towards the other end of the adapter, it has a spider 313 with a central aperture for a rod 314 inter-connecting the pistons 306,307. The spring acts between the spider and the inner side of the piston 306.

The piston 307 is similar in having an O-ring 315 carried in its parallel periphery 316. The adapter has a parallel bore 317 at this end, with which the piston 307 seals when in its normal position. On refueling use, the female-end piston 307 moves out of the bore 317, and co-operates in a dry-break manner with the member of the refueling coupling.

Figure 17:
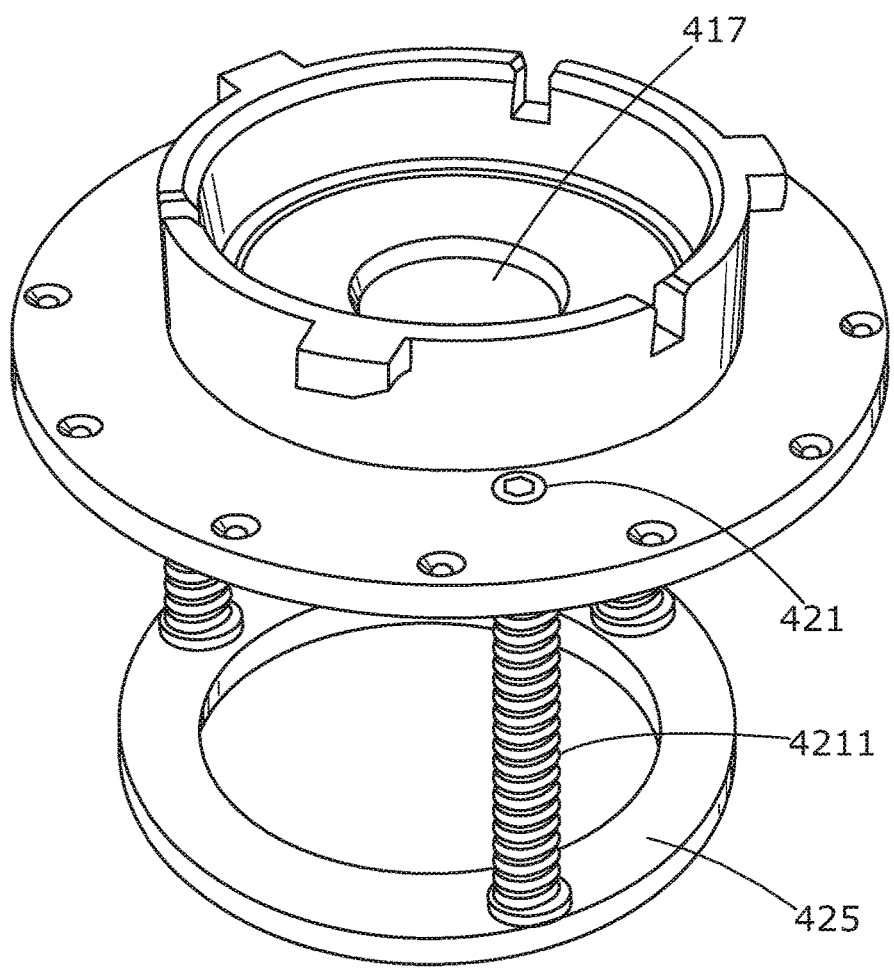
FIG. 17 is a variant of the coupling of FIG. 2.

The invention is not intended to be restricted to the details of the above described embodiments. For instance as shown in FIG. 17, the spider 25 of the coupling of FIG. 2, holding the bottom ends of the rods 21 and against which the springs 211, can be replaced with a ring 425, equally holding rods 421 and providing abutment for the springs 4211. The advantage of the ring is that it enables fuel to be scavenged from a disabled vehicle by another vehicle fitted with a long pipe (not shown) at the end of a scavenge hose and pump system, the long pipe being able to be passed through the coupling's pivoted disc or flap 417 and through that the ring 425 towards the bottom of the tank of the vehicle having the coupling 425 and from which fuel is being scavenged.

What is claimed is:

1. A refueling coupling having:
    an annular member,
    a fitting on the annular member including bayonet lugs and slots complementary to a pressure refueling nozzle,
    a displaceable dry-break member in the coupling for sealing the coupling via a seal between the annular member and the dry-break member, the dry-break member being displaceable from a sealing position on connection of a pressure refueling nozzle, the dry-break member including:
        an aperture in the displaceable dry-break member and
        a subsidiary displaceable member carried by the dry-break member, this member closing the aperture and being displaceable by introduction of a gravity refueling nozzle into the aperture.

2. A refueling coupling as claimed in claim 1, wherein the subsidiary displaceable member is translationally displaceable with respect to the displaceable dry-break member against a subsidiary return spring.

3. A refueling coupling as claimed in claim 1, wherein the subsidiary displaceable member is pivotally displaceable with respect to the displaceable dry-break member against a subsidiary return spring.

4. A refueling coupling as claimed in claim 3, wherein the subsidiary return spring is a spring arranged to act about a pivot about which the subsidiary displaceable member is pivotally displaceable.

5. A refueling coupling as claimed in claim 1, including a seal for sealing of the subsidiary displaceable member to the dry-break member, whereby full dry-break operation is available when pressure refueling.

6. A refueling coupling as claimed in claim 1, wherein the displaceable dry-break member is translationally displaceable in the coupling against at least one main return spring.

7. A refueling coupling as claimed in claim 6, including a plurality of rods secured in the coupling and on which the dry-break member is displaceably carried, a plurality of main return springs being mounted on the rods and acting against abutments at ends of the rods remote from the dry-break member.

8. A refueling coupling as claimed in claim 7, wherein the abutments are provided by an abutment member in the form of a spider or a ring interconnecting the remote ends of the rods.

9. A refueling coupling as claimed in claim 7, including:
    an annular rim or lip on or sealingly connectable to the annular member,
    a second annular rim or lip member connectable to a wall of a fuel tank and
    a sleeve or hose securable to the annular rim for extension around the rods and to the second annular rim or lip member.

10. A refueling coupling as claimed in claim 7, including a sleeve integrally or fixedly extending back from the annular member, the abutments being provided on the sleeve remote from the annular member.

11. An adapter in combination with the refueling coupling as claimed in claim 1, the adapter being generally tubular and having:
    a fitting at one end complementary to a pressure refueling nozzle,
    a fitting at the other end complementary to that on the annular member and
    a shuttle extending between the ends of the adapter, the shuttle being adapted and arranged to be displaced by a displacement member of the pressure refueling nozzle and to displace the displaceable dry-break member.

12. A refueling combination as claimed in claim 11, wherein the shuttle has a spring urging the shuttle towards the one end fitting.

13. A refueling combination as claimed in claim 12, wherein the shuttle has:
    a dry-break piston at one end adapted to be urged by the spring against a seat in the adapter in sealing engagement with the one end of the adapter and
    a dry-break piston at the other end adapted to slidingly seal with the other end of the adapter when the one-end dry-break piston is against the seat,
    the arrangement being such that for refueling with the shuttle displaced, the one-end dry-break piston is moved off the seat and the other-end dry-break piston is moved out of sealing with the other end of the adapter.

14. A refueling coupling comprising:
    an annular member;
    a fitting on the annular member including bayonet lugs and slots complementary to a pressure refueling nozzle;
    a displaceable dry-break member in the coupling for sealing the coupling via a seal between the annular member and the dry-break member, the dry-break member being displaceable from a sealing position on connection of a pressure refueling nozzle, the dry-break member comprising:
        an aperture in the displaceable dry-break member; and
        a subsidiary displaceable member carried by the dry-break member, this member closing the aperture and being displaceable by introduction of a gravity refueling nozzle into the aperture;
    an air vent having a float arranged to close as a tank fills for causing back-pressure in a connector when the tank is full; and
    an airflow restrictor in a duct of the air vent, the restrictor being adapted to open to a limited extent to accommodate gravity refueling air escape and to a greater extent to allow an increased air flow in the case of pressure refueling;
        wherein the restrictor has:
            an apertured sleeve mounted in the duct for movement axially thereof;
            a first spring mounted on the sleeve for urging the sleeve against the direction of the airflow in the duct during refueling;
            a first disc carried by the sleeve and a seat in the duct, the first spring urging the first disc into contact with the seat to close the duct;
            an inner member mounted in the sleeve for movement axially thereof;
            a secondary spring mounted on the inner member for urging the inner member against the direction of the airflow in the duct during refueling;
            a secondary disc smaller than the first disc, carried by the inner member, and a secondary seat on the first disc around an aperture therein, the secondary spring urging the secondary disc into contact with the secondary seat to close the first disc,
        the arrangement being such that on low air flow in the duct, as in gravity refueling, the secondary disc moves from the secondary seat against the secondary spring and on high air flow in the duct, as in pressure refueling, the first disc moves from the seat in the duct against the first spring.

* * * * *